(12) United States Patent
Walter et al.

(10) Patent No.: US 7,653,915 B1
(45) Date of Patent: *Jan. 26, 2010

(54) N X M PLATFORM COMBINATION

(75) Inventors: Kevin Walter, Los Altos, CA (US); Ajay Pratap Singh Kushwah, San Ramon, CA (US); Ajay Bakhshi, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 333 days.

This patent is subject to a terminal disclaimer.

(21) Appl. No.: 10/948,620

(22) Filed: Sep. 23, 2004

Related U.S. Application Data

(60) Provisional application No. 60/510,458, filed on Oct. 10, 2003.

(51) Int. Cl.
*G06F 13/00* (2006.01)
(52) U.S. Cl. .................. 719/328; 719/311; 719/313
(58) Field of Classification Search .............. 719/328, 719/311, 313
See application file for complete search history.

(56) References Cited

U.S. PATENT DOCUMENTS

| | | | |
|---|---|---|---|
| 5,668,958 A | 9/1997 | Bendert et al. | |
| 6,134,602 A | 10/2000 | Engstrom et al. | |
| 6,253,257 B1 | 6/2001 | Dundon | |
| 6,671,745 B1 | 12/2003 | Mathur et al. | |
| 6,708,227 B1 | 3/2004 | Cabrera et al. | |
| 6,732,365 B2 | 5/2004 | Belknap et al. | |
| 6,848,110 B2 * | 1/2005 | Salmon | 719/328 |
| 7,072,916 B1 | 7/2006 | Lewis et al. | |
| 7,117,505 B2 | 10/2006 | Lanzatella et al. | |
| 7,127,713 B2 * | 10/2006 | Davis et al. | 717/177 |
| 7,243,267 B2 * | 7/2007 | Klemm et al. | 714/38 |
| 2003/0093583 A1 * | 5/2003 | Doran et al. | 709/328 |
| 2004/0054640 A1 * | 3/2004 | Reichel et al. | 707/1 |
| 2004/0177361 A1 * | 9/2004 | Bernhard et al. | 719/321 |
| 2004/0205692 A1 * | 10/2004 | Robinson | 717/100 |
| 2005/0015439 A1 * | 1/2005 | Balaji et al. | 709/203 |

* cited by examiner

*Primary Examiner*—Andy Ho
(74) *Attorney, Agent, or Firm*—Van Pelt, Yi & James LLP

(57) ABSTRACT

According to some embodiments, a technique for storing data comprises providing an application-specific module, wherein the application-specific module communicates with an application; providing a storage-specific module, wherein the storage-specific module communicates with a storage; and providing a common interface, wherein the common interface communicates with the application-specific module and the storage-specific module.

24 Claims, 10 Drawing Sheets

N X M PLATFORM COMBINATION

CROSS REFERENCE TO OTHER APPLICATIONS

This application claims priority to U.S. Provisional Patent Application No. 60/510,458 entitled Availability Protection System & Method filed Oct. 10, 2003 which is incorporated herein by reference for all purposes.

FIELD OF THE INVENTION

The present invention relates generally to computer systems, more specifically to data storage.

BACKGROUND OF THE INVENTION

Data is typically associated with an application, such as Oracle data base or Microsoft Word. When backing up data, there is typically a coupling of the data with a particular storage medium. For every combination of a particular application and a particular storage medium, a substantial amount of new code is often written to facilitate the backup. This writing of the code and testing for each combination of application and storage medium can be inefficient and costly. It would be desirable to be able to leverage on the work that has already been done and efficiently add new applications and new storage media.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
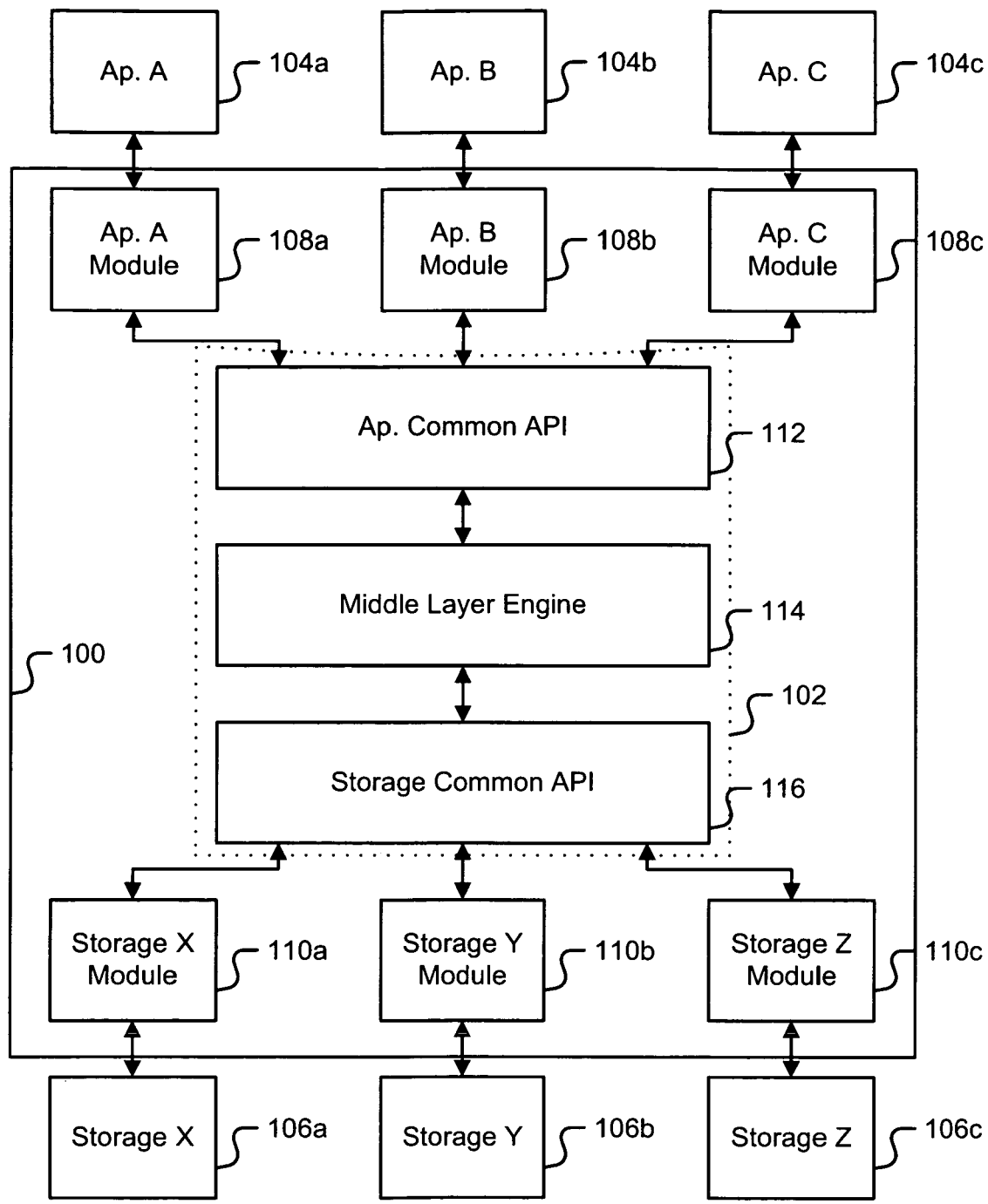
FIG. 1 is a block diagram of a system for storing data according to some embodiments.

FIG. 1 is a block diagram of a system for storing data according to some embodiments. In this example, applications 104A-104C are shown to be coupled with storage 106A-106C through a middle layer 100. Within the middle layer, application modules 108A-108C are shown to be coupled with applications 104A-104C. Examples of applications 104A-104C include Oracle database, Microsoft Excel, and Microsoft Word. Storage modules 110A-110C are also shown to be coupled with storage 106A-106C. Examples of storage 106A-106C include storage arrays, tape drives, and software storage subsystems. The applications modules 108A-108C and storage modules 110A-110C are also shown to be coupled through a common interface 102. The common interface is shown to include an application common API 112, a middle layer engine 114, sometimes herein referred to as the engine, and a storage common API 116.

When data is to be backed up for one of the applications 104A-104C, the application communicates with its corresponding application module 108A-108C. For example, if application 104B is an Oracle database and the data within that application is to be backed up, then its corresponding module 108B which is familiar with details required to backup the Oracle database 104B would communicate with the application 104B and also with the application common API 112. The application modules 108A-108C are application-specific in some embodiments, whereas the application common API 112 is not application-specific in some embodiments. Accordingly, the application-specific information needed to backup data for a particular application can be included in the application modules 108A-108C, while the non-application-specific information, such as information or functions commonly used by all of the applications 104A-104C, used for backing up data for an application may be included in the application common API 112. Accordingly, if a new application, such as 104C, is added to the system, then its corresponding application-specific module 108C can be added to the system without having to change the rest of the middle layer 100. Likewise, if a new storage 106C is added, then its corresponding storage module 110C may be added to facilitate data sent to the storage 106C without having to change the rest of the middle layer 100 according to some embodiments.

Figure 2A:
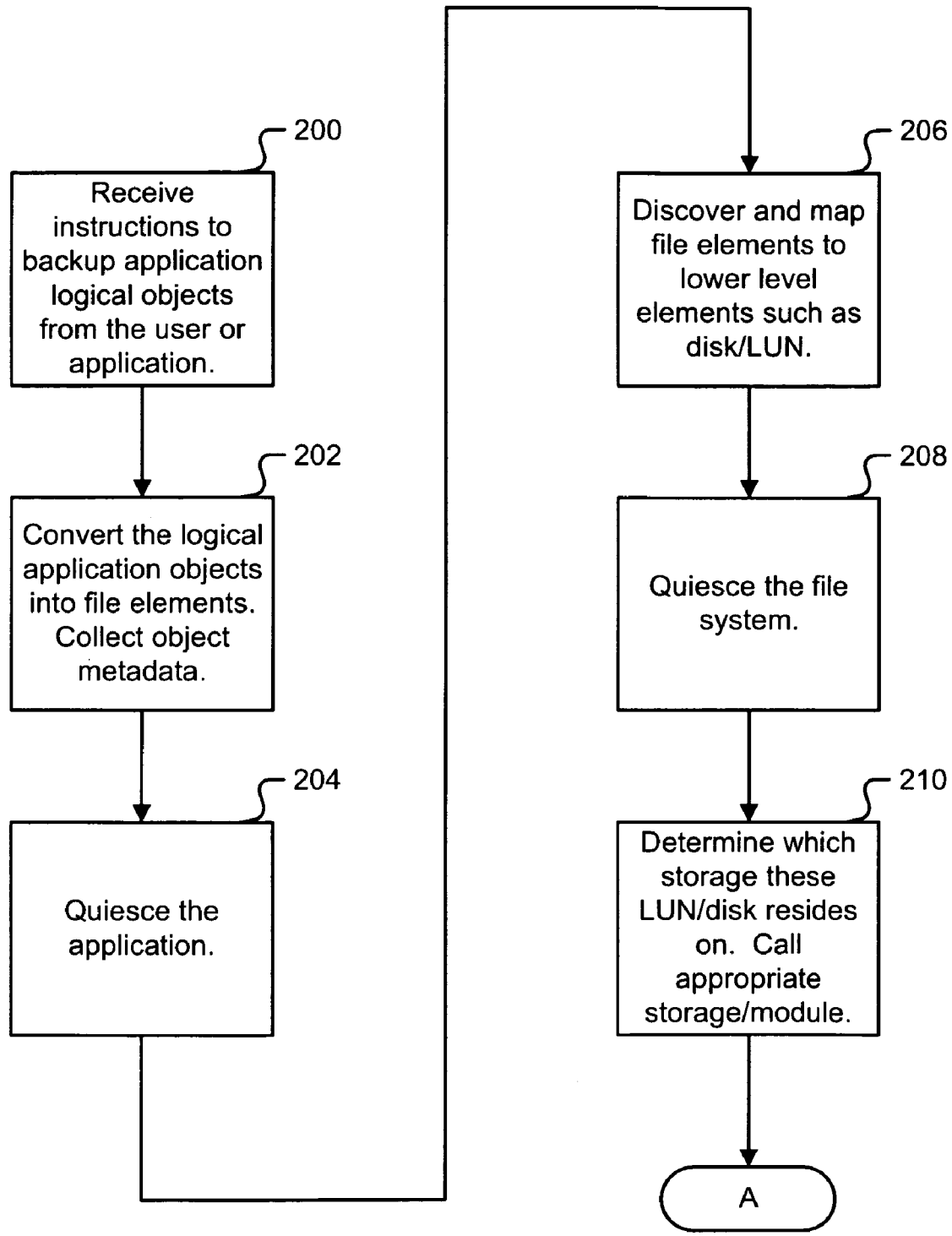
FIGS. 2A-2B are flow diagrams of a method for storing data according to some embodiments.
Figure 2B:
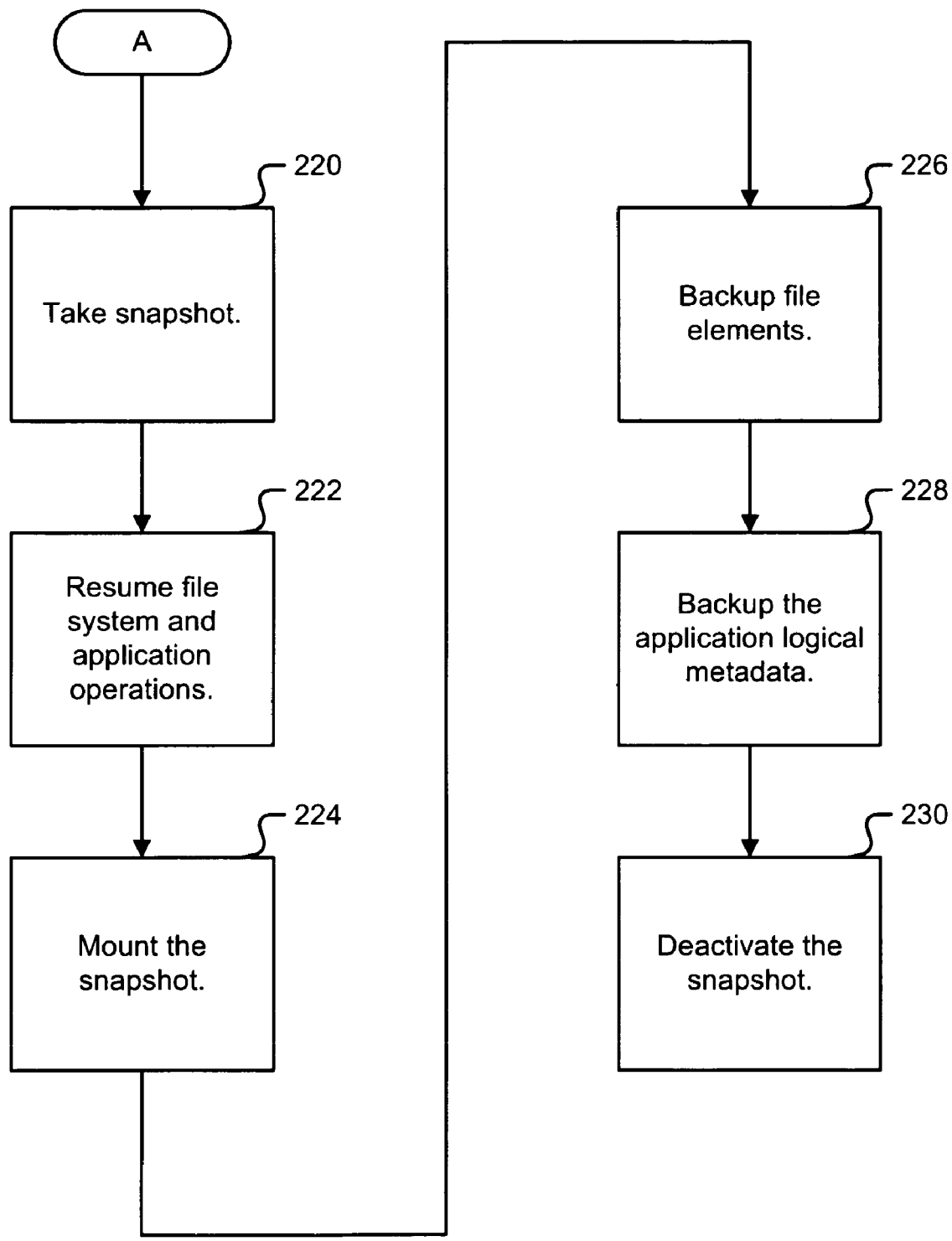

FIGS. 2A-2B are flow diagrams of a method for storing data according to some embodiments. In this example, instructions are received to backup application logical objects from the user or application (200). The logical application objects are converted into file elements and object metadata is collected (202). The application is then made quiescent (204). For example, changes to the application at this time can be queued to avoid corruption of the data snapshot. A snapshot, as used herein, includes data and information at a given point in time. For example, a snapshot taken of the Oracle database taken at 3:00 p.m. includes the data and information of the database as it was at 3:00 p.m. according to some embodiments, and a user can retrieve the 3:00 data at a later time. When an application is made quiescent, no further changes to that data are made so that a snapshot of a particular time can be taken.

In some embodiments, (200)-(204) are performed by the application module, such as application modules 108A-108C in FIG. 1.

File elements are then discovered and mapped to lower level elements, such as a disk or a logical unit number (LUN) (206). The file system is also made quiescent (208). The storage upon which these LUN/disk resides on is determined and the storage module corresponding to the determined storage is called (210). In some embodiments, (206)-(210) are performed by the middle layer engine, such as the middle layer engine 102 of FIG. 1. The snapshot is then taken (220). For example, the snapshot of the data at 3:00 is taken of the Oracle database. In some embodiments, the snapshot is performed by the storage module and the storage common API, such as the storage modules 110A-110C and the storage common API 116 shown in FIG. 1.

The file system and application operations are then resumed (222). In other words, the file system and application are no longer quiescent. The snapshot is mounted (224), and the file elements are backed up (226). For example, the file elements, such as data, can be backed up to a disk, a storage array, or tape. The application logical metadata is also backed up (228). For example, the metadata can be the information associated with the backed up data, such as in which tape drive a particular file element is stored. In some embodiments, (222)-(228) are performed by the middle layer engine. The snapshot is then deactivated so that the snapshot is no longer visible to the host operating system (230). In some embodiments, the snapshot deactivation is performed by the storage module and the storage common API.

FIG. 3 is a flow diagram of a method for using an application common API according to some embodiments. The application common API may include functions that are common to taking a snapshot of any application. Examples of these functions include transferring functional input indicating what is to be backed up, finding file elements, and providing logical object metadata to be stored with those logical objects. An example of a simplified application common API functional call sequence during backups includes the following:

| | |
|---|---|
| Pb_version( ) | get the list of versions supported by the middle layer service (optional) |
| pb_discover | discover the supported snapshot vendors by middle layer service (optional) |
| pb_init | start a middle layer session |
| pb_inquiry | determine whether a particular object is snapshot capable (optional) |
| pb_open | open middle layer service for backup operation for a list of objects |
| pb_inquiry | determine the objects that should be prepared and snapshot together (optional) |
| pb_prepare | prepare for the snapshot, could be called multiple times with different objects |
| pb_status | get the status of pb_prepare |
| pb_snapshot | take the snapshot, could be called multiple times with different objects |
| pb_status | get the status of pb_snapshot |
| pb_save | save the snapshot, could be called multiple times with different objects |
| pb_status | get the status of the pb_save. |
| pb_inquiry | with PB_INQ_MDK (optional) to pass the object metadata. |
| pb_postpare | perform post-processing for the snapshot |
| pb_status | get the status of the pb_postpare |
| pb_close | close application API operation |
| pb_end | end the session |

An example of a simplified application common API functional call sequence during restore includes the following:

| | |
|---|---|
| Pb_version( ) | get the list of versions supported by the middle layer service (optional) |
| pb_discover | discover the supported snapshot vendors by middle layer services (optional) |
| pb_init | start a middle layer session |
| pb_inquiry | determine whether a particular object is appropriate for middle layer service (optional) |
| pb_open | open middle layer service for restore operation for a list of objects |
| pb_prepare | prepare for the restore, could be called multiple times with different objects |
| pb_status | get the status of the pb_prepare |
| pb_retrieve_metadata | get the metadata for objects participating in restore. |
| pb_status | get the status of the pb_retrieve_metadata |
| pb_restore | restore the data, could be called multiple times with different objects |
| pb_status | get the status of the pb_restore |
| pb_postpare | perform post-processing for the restore |
| pb_status | get the status of the pb_postpare |
| pb_close | close application API operation |

Figure 3A:
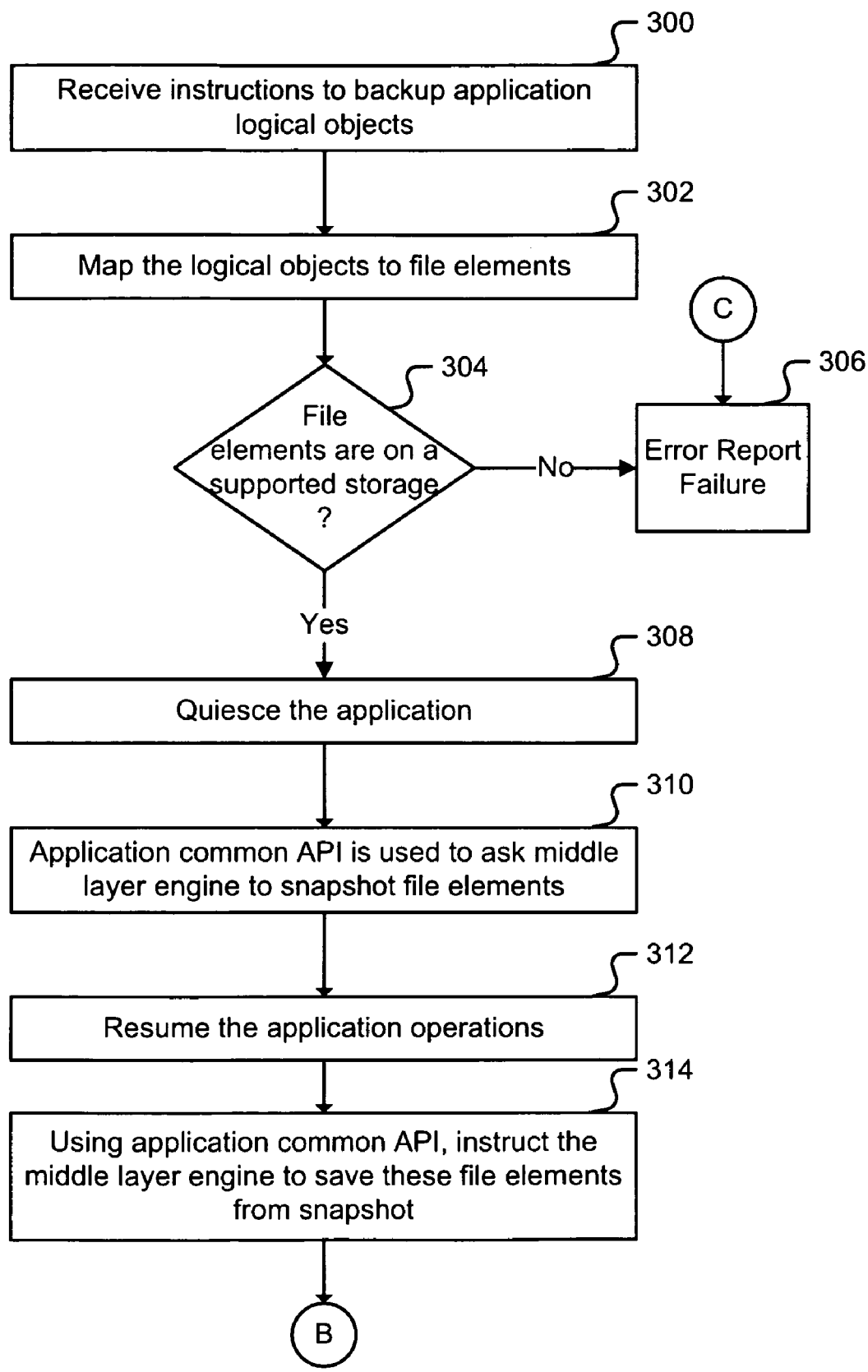
FIGS. 3A-3B are flow diagrams of a method for using an application common API according to some embodiments.
Figure 3B:
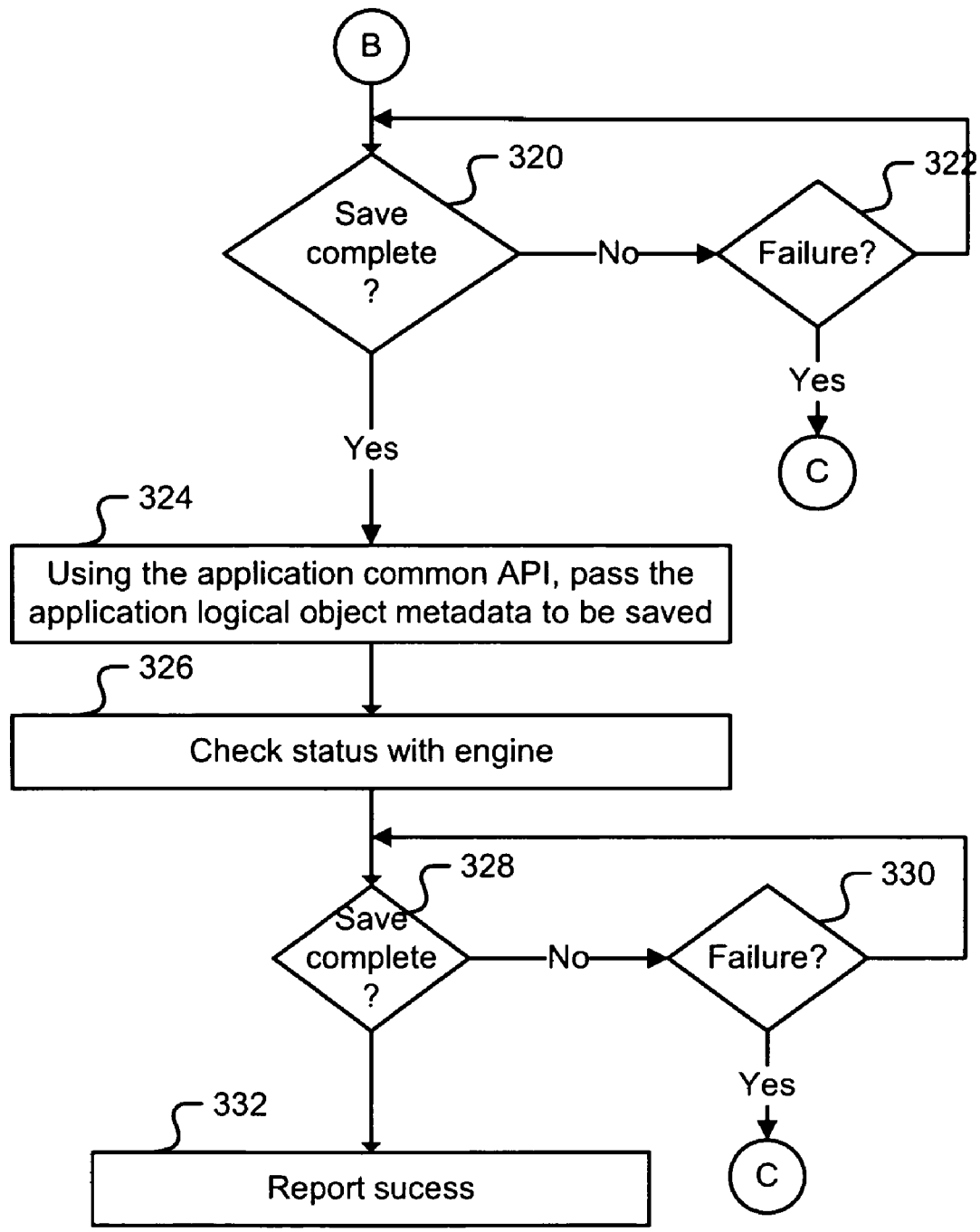

In the example shown in FIGS. 3A-3B, instructions to backup application logical objects is received (300). The logical objects are then mapped to file elements (302). It is determined whether the file elements are on a supported storage (304). In some embodiments, the application common API inquires of the middle layer engine whether the file elements are on a supported storage. If the file elements are not on a supported storage, then failure is reported (306).

If, however, file elements are on a supported storage (304), then the application is made quiescent (308). The application common API is then used to ask the middle layer engine to snapshot file elements in this example (310). The application operations are then resumed (312), such that the application is no longer quiescent.

Using the application common API, the middle layer engine is instructed to save these file elements from the snapshot (314).

It is then determined whether the saving of the file elements is complete (320). If the save is not complete, then it is determined if there has been a failure (322), and if so, the error is reported (306).

If the save is complete (320), then the application common API passes the application logical object metadata to be saved (324). The status is checked with the engine (326), and it is determined whether the metadata has been saved (328). If the metadata has not finished saving, then it is determined whether there has been a failure (330). If a failure has occurred, then the error is reported (306). If, however, the metadata has successfully saved (328), then the success is reported (332).

Figure 4:
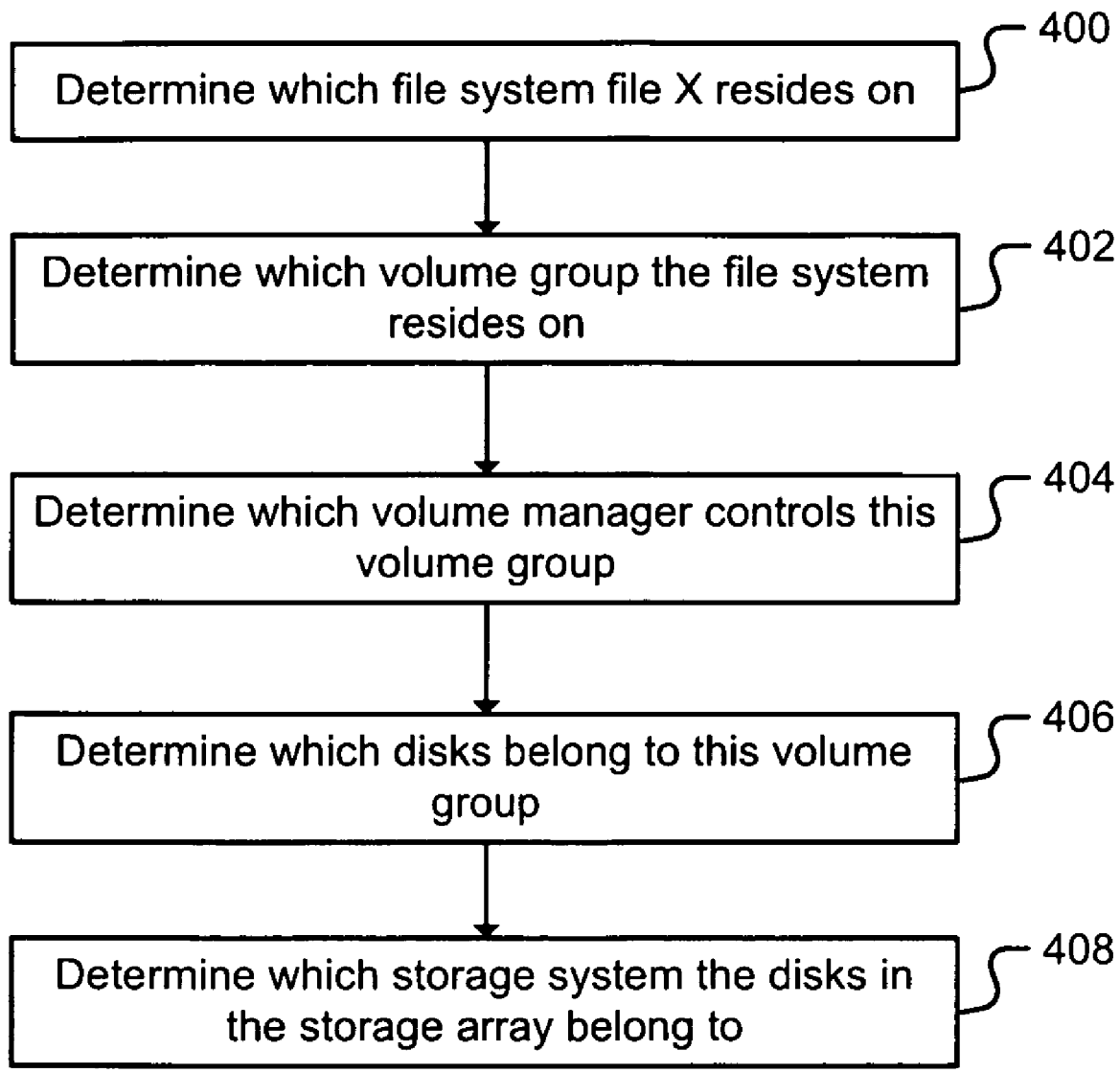
FIG. 4 is a flow diagram of a method for discovering and mapping file elements to the lower level elements, such as disk/LUN, according to some embodiments.

FIG. 4 is a flow diagram of a method for discovering and mapping file elements to the lower level elements, such as disk/LUN, according to some embodiments, such as the example shown in 206 of FIG. 2A. In this embodiment it is assumed that a volume group and volume manager exists. In other embodiments, volume managers and volume groups are not used.

In the example shown in FIG. 4, it is determined which file system a particular file, such as file X, resides on (400). It is also determined which volume group the file system resides on (402). The volume manager which controls this volume group is determined (404). The disks belonging to this volume group is also determined (406). It is then determined which storage system the disks in the storage array belong to (408).

Figure 5:
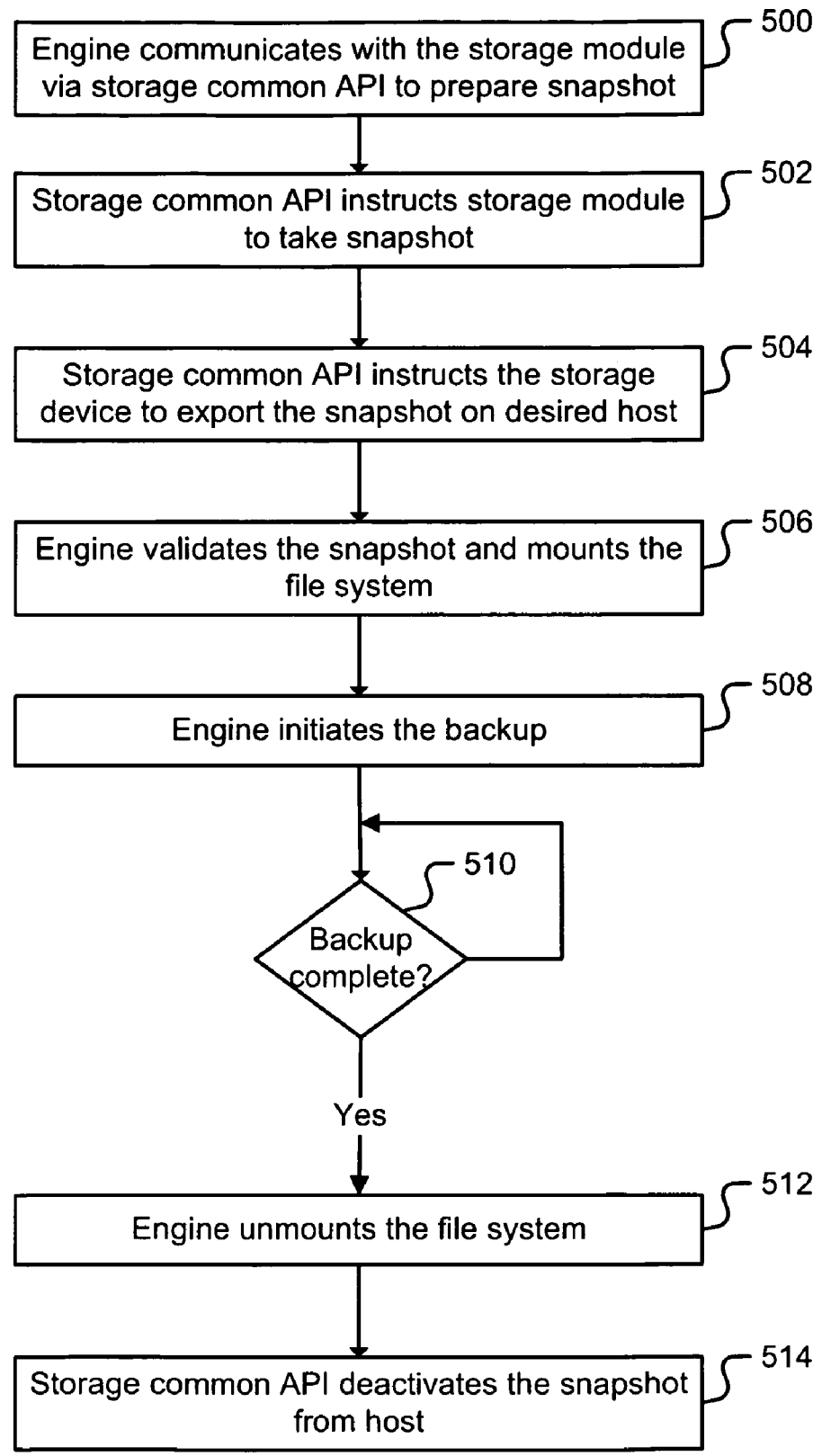
FIG. 5 is a flow diagram of using a storage common API according to some embodiments.

FIG. 5 is a flow diagram of using a storage common API according to some embodiments. The storage common API includes non-storage specific functions that can be used to take a snapshot. These functions can be functions that are commonly used by any storage subsystem. The storage common API can be used in conjunction with a storage specific module to perform functions on a particular storage. Examples of functions included in the storage common API includes storing file elements along with metadata for logical objects with a backup application, such as Networker by Legato Inc., a division of EMC. Examples of functions included in the storage common API include the following: GetSupportedProviderVersion, getSourceList, getChangedExtents, getSnapshotState, getSnapshotHandle, getSnapshotAccessPath, addComponent, prepareForSnapshot, snapshot, postSnapshot, deleteSnapshot, rollback, restoreTo, shareTo, mount, unmount, getCurrentTask, getTaskStatus, cancelTask, setProviderAttribute, setProviderAttribute, getProviderAttribute, getProviderAttribute In the example shown in FIG. 5, the middle layer engine communicates with the storage module via the storage common API to prepare a snapshot (500). The storage common API then instructs the storage module to take the snapshot (502). The storage common API instructs the storage device to export the snapshot on a desired host (504). The engine then validates the snapshot and mounts the file system (506). The engine then initiates the backup (508).

Once the backup is complete (510), then the engine unmounts the file system (512), and the storage common API deactivates the snapshot from the host operating system (514). When the snapshot is deactivated from the host, then the host no longer sees the snapshot.

Figure 6:
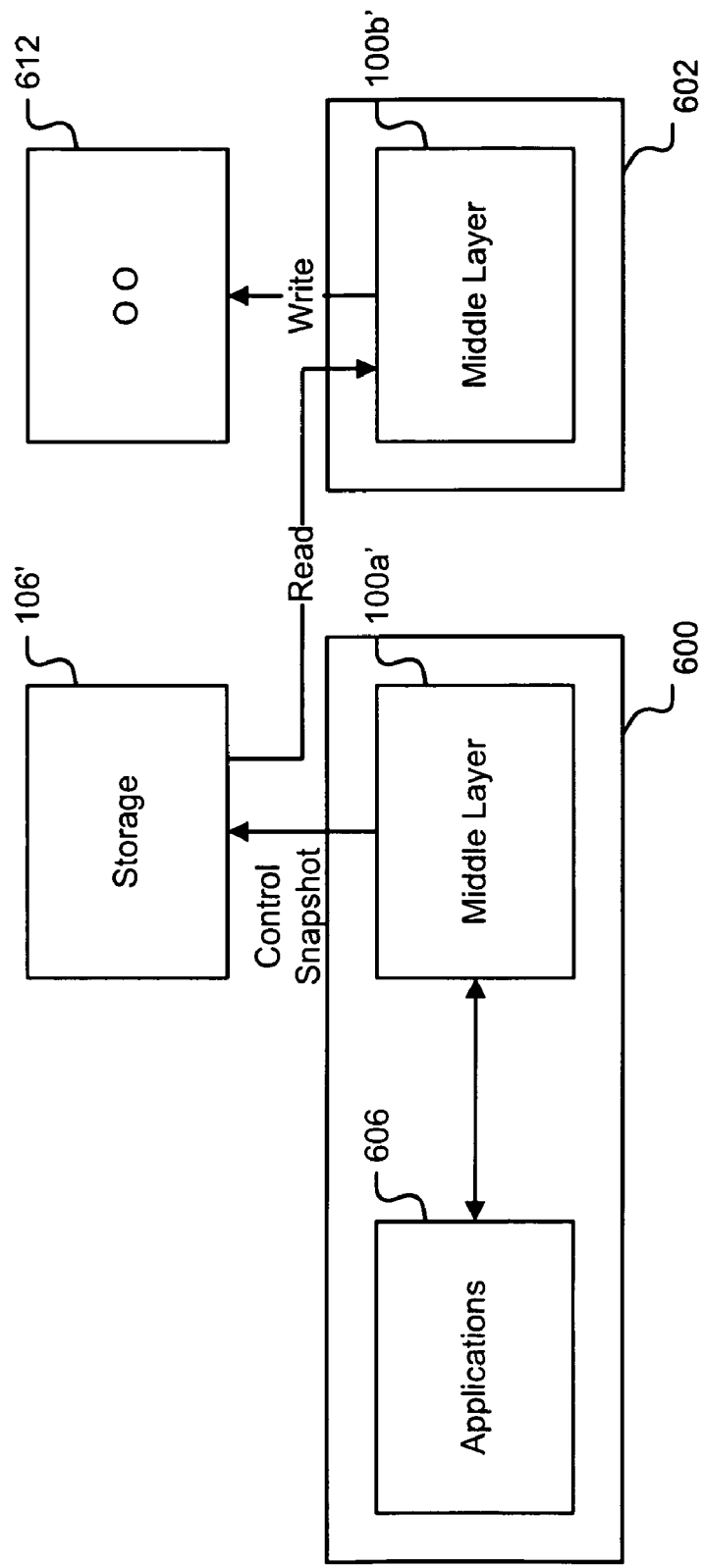
FIG. 6 is a block diagram of a system for backing up data according to some embodiments.

FIG. 6 is a block diagram of a system for backing up data according to some embodiments. The backup techniques illustrated in FIGS. 1-5 can be executed in either a single machine or multiple machines. The example shown in FIG. 6 shows a multiple machine configuration where device 600 and 602 both include the middle layers 100A' and 100B'. Machine 600 also includes the applications 606. The middle layer 100A' controls the snapshot associated with storage 106', while the middle layer 100B' reads the snapshot from storage 106' and writes information to a storage media 612. All of these functionalities can be performed within a single machine, or alternatively in multiple machines to offload processing in the application machine.

Figure 7:
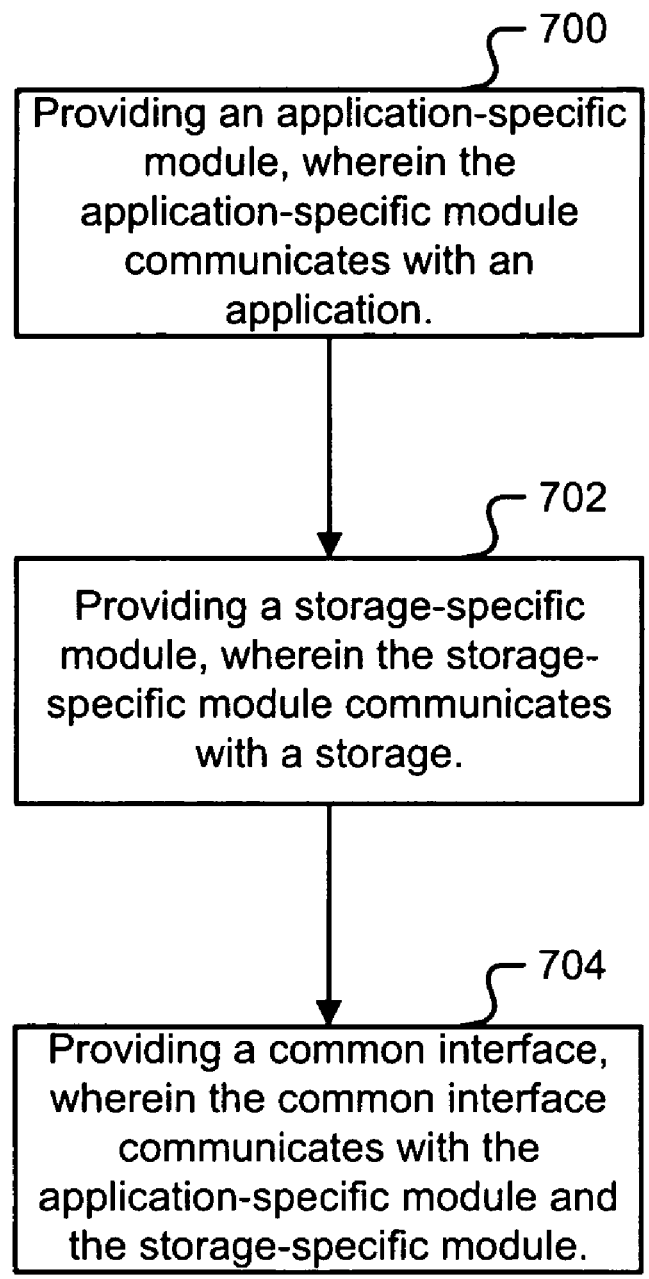
FIG. 7 is a flow diagram of a method for storing data according to some embodiments.

FIG. 7 is a flow diagram of a method for storing data according to some embodiments. In this example, an application-specific module is provided, wherein the application-specific module communicates with an application (700). A storage-specific module is also provided, wherein the storage-specific module communicates with a storage (702). A common interface is also provided, wherein the common interface communicates with the application-specific module and the storage-specific module (704).

Figure 8:
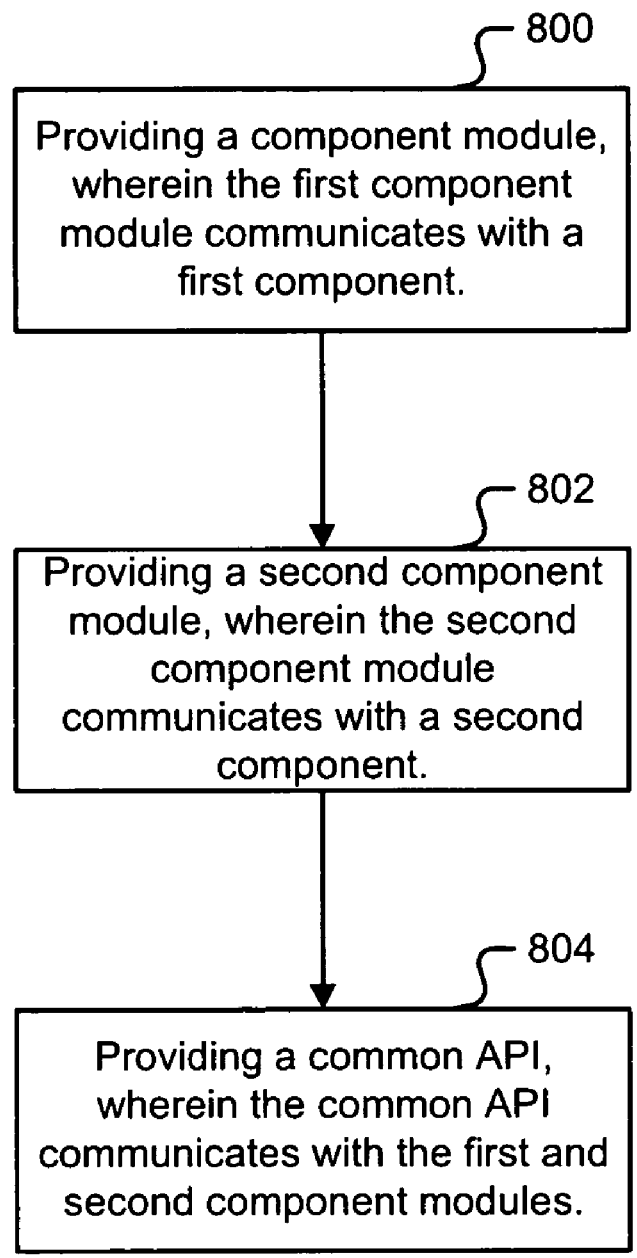
FIG. 8 is a flow diagram of a method for storing data according to some embodiments.

FIG. 8 is a flow diagram of a method for storing data according to some embodiments. In this example, a component module is provided, wherein the first component module communicates with a first component (800). A second component module is also provided, wherein the second component communicates with a second component (802). A common API is also provided, wherein the common API communicates with the first and second component modules (804).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data comprising:
providing an application-specific module, wherein the application-specific module communicates with an application;
providing a storage-specific module, wherein the storage-specific module communicates with a storage; and
providing a common interface, wherein:
the common interface communicates with the application-specific module and the storage-specific module;
the application-specific module acts as an intermediary between the application and the common interface, wherein
the application-specific module comprises functions needed to backup data for a particular application, and
the common interface comprises non-application-specific functions commonly used by a plurality of applications;
the storage-specific module acts as an intermediary between the storage and the common interface, wherein
the storage-specific module comprises functions for a particular storage,
the common interface comprises non-storage-specific functions that can be used to take a snapshot, and
the snapshot includes data and information at a given point in time; and
the application-specific module, the common interface, and the storage-specific module are configured to cooperate to back up application data.

2. The method of claim 1, further comprising providing a second application-specific module, wherein the second application-specific module communicates with the common interface.

3. The method of claim 1, further comprising providing a second storage-specific module, wherein the second storage-specific module communicates with the common interface.

4. The method of claim 1, wherein the common interface includes an application common API.

5. The method of claim 4, wherein the application common API is not customized when a second application is added.

6. The method of claim 1, wherein the common interface includes a storage common API.

7. The method of claim 6, wherein the storage common API is not customized when a second storage is added.

8. The method of claim 1, wherein the common interface includes a middle layer engine.

9. The method of claim 8, wherein the middle layer engine is not customized when a second application is added.

10. The method of claim 8, wherein the middle layer engine is not customized when a second storage is added.

11. The method of claim 1, wherein the common interface is not customized when a second application is added.

12. The method of claim 1, wherein the common interface is not customized when a second storage is added.

13. The method of claim 1, wherein the common interface is not application-specific.

14. The method of claim 1, wherein the common interface is not storage-specific.

15. A system for storing data comprising:
a processor configured to:
provide an application-specific module, wherein the application-specific module communicates with an application;
provide a storage-specific module, wherein the storage-specific module communicates with a storage; and
provide a common interface, wherein:
the common interface communicates with the application-specific module and the storage-specific module;
the application-specific module acts as an intermediary between the application and the common interface, wherein
the application-specific module comprises functions needed to backup data for a particular application, and
the common interface comprises non-application-specific functions commonly used by a plurality of applications;
the storage-specific module acts as an intermediary between the storage and the common interface, wherein
the storage-specific module comprises functions for a particular storage,
the common interface comprises non-storage-specific functions that can be used to take a snapshot, and
the snapshot includes data and information at a given point in time; and
the application-specific module, the common interface, and the storage-specific module are configured to cooperate to back up application data; and
a memory coupled to the processor, wherein the memory provides the processor with instructions.

16. The system of claim 15, further comprising providing a second application-specific module, wherein the second application-specific module communicates with the common interface.

17. The system of claim 15, further comprising providing a second storage-specific module, wherein the second storage-specific module communicates with the common interface.

18. The system of claim 15, wherein the common interface is not customized when a second application is added.

19. The system of claim 15, wherein the common interface is not customized when a second storage is added.

20. A computer program product for storing data the computer program product being embodied in a computer readable storage medium and comprising computer instructions for:
providing an application-specific module, wherein the application-specific module communicates with an application;
providing a storage-specific module, wherein the storage-specific module communicates with a storage; and
providing a common interface, wherein:
the common interface communicates with the application-specific module and the storage-specific module;
the application-specific module acts as an intermediary between the application and the common interface, wherein
the application-specific module comprises functions needed to backup data for a particular application, and
the common interface comprises non-application-specific functions commonly used by a plurality of applications;
the storage-specific module acts as an intermediary between the storage and the common interface, wherein
the storage-specific module comprises functions for a particular storage,
the common interface comprises non-storage-specific functions that can be used to take a snapshot, and
the snapshot includes data and information at a given point in time; and
the application-specific module, the common interface, and the storage-specific module are configured to cooperate to back up application data.

21. The computer program product of claim 20, further comprising providing a second application-specific module, wherein the second application-specific module communicates with the common interface.

22. The computer program product of claim 20, further comprising providing a second storage-specific module, wherein the second storage-specific module communicates with the common interface.

23. The computer program product of claim 20, wherein the common interface is not customized when a second application is added.

24. The computer program product of claim 20, wherein the common interface is not customized when a second storage is added.

* * * * *